UNITED STATES PATENT OFFICE.

ROBERT NEISCH, OF NEW YORK, N. Y.

IMPROVEMENT IN PREPARING ARTIFICIAL STONE.

Specification forming part of Letters Patent No. 14,824, dated May 6, 1856.

*To all whom it may concern:*

Be it known that I, ROBERT NEISCH, of the city, county, and State of New York, have invented certain new and useful Improvements in Making Artificial Stone or an Article of Great Insolubility, Durability, and Hardness; and I do hereby declare the following to be a full, clear, and exact description of the same.

The nature of my invention consists in preparing artificial stone by working plaster-of-paris previously calcined, together with sulphuric acid, with a solution of alum and carbonate of ammonia into a paste to be molded or cast into useful and ornamental forms and to possess a very desirable degree of hardness, insolubility, and durability.

The manner of preparing the several component parts, the proportion of each, the manner of admixture, and subsequent treatment are as follows: Take of ground or small pieces of gypsum or plaster-of-paris (raw or uncalcined preferred on account of its being cheaper than the calcined) four parts, by measure, add about one part by the same measure of sulphuric acid, then add the same measure—that is, about one part—of water, and triturate the whole mass with a trowel or any other suitable implement, work the whole well together until the mass assumes the consistency of moist sugar, then calcine it. The calcining of the so-mixed sulphate of lime is done in the usual way and manner, and it is particularly necessary to stir the whole mass frequently up as soon as the smoke or gases begin to ascend. After the calcining is finished the plaster ought to be ground. The plaster so prepared can then be used, molded, or cast in the manner usually employed by plaster-workers or by men in the potteries by adding a solution of alum and carbonate of ammonia.

To make any useful form or ornament the plaster so calcined or prepared, as described before, must assume the consistency of mortar or clay by adding cold solutions of alum or ammonia, or a solution composed of alum and ammonia in any measure, and must then be firmly dabbled into the mold with the fingers, or in the same way as the clay, &c., is worked into molds in the potteries. After the cast is taken out of the mold the newly-formed article should be left for some time in a warm, dry atmosphere to get it entirely dry, when it must be immersed in a boiling-hot solution of alum or ammonia, or a solution composed of alum and ammonia in any measure, for about fifteen minutes or longer, according to the size of the article, then suffered to cool in the solution, when the cast can be taken out and suffered to dry.

Instead of putting the new article into a hot solution, the same can be cold, but it would then be necessary to immerse the molded form for several hours, or for, in some instances, even twenty-four hours. It would make no difference to make the second solution for immersing the article when the first solution was composed of alum alone, to make the second solution of ammonia and alum, or only of ammonia, or vice versa. When the article after the immersion is entirely dry it will have all the hardness and insolubility required for practical purposes, either protected from or exposed to the weather.

To make a stone-like material sand, slags, or cinders from any metal furnace, ashes, &c., may be added to the plaster in various proportions.

I do not claim the combination of alum solution with commonly calcined plaster-of-paris or gypsum, as I am aware that such mixture has before been used; but I do claim and desire to secure by Letters Patent—

The preparation of artificial stone by treating plaster-of-paris previously calcined, together with sulphuric acid, with solutions of alum and carbonate of ammonia in the manner substantially as described above.

ROBERT NEISCH.

Witnesses:
JOHN WRAY,
WM. EDWARDS.